(12) United States Patent
So (10) Patent No.: US 8,091,512 B2
(45) Date of Patent: Jan. 10, 2012

(54) ANIMAL TRAINING APPARATUS AND CONTROL METHOD THEREOF

(76) Inventor: Ho Yun So, Seoul (KR)

( * ) Notice: Subject to any disclaimer, the term of this patent is extended or adjusted under 35 U.S.C. 154(b) by 107 days.

(21) Appl. No.: 12/632,190

(22) Filed: Dec. 7, 2009

(65) Prior Publication Data

US 2011/0030622 A1 Feb. 10, 2011

(30) Foreign Application Priority Data

Aug. 6, 2009 (KR) .................. 10-2009-0072422

(51) Int. Cl.
*A01K 15/02* (2006.01)
(52) U.S. Cl. ..................................... 119/719; 119/718
(58) Field of Classification Search .................. 119/718, 119/719, 720, 721; 340/573.3
See application file for complete search history.

(56) References Cited

U.S. PATENT DOCUMENTS

| | | | | |
|---|---|---|---|---|
| 5,046,453 A * | 9/1991 | Vinci | | 119/718 |
| 6,047,664 A * | 4/2000 | Lyerly | | 119/719 |
| 6,079,367 A * | 6/2000 | Stapelfeld et al. | | 119/720 |
| 6,415,742 B1 * | 7/2002 | Lee et al. | | 119/721 |
| 6,588,376 B1 * | 7/2003 | Groh | | 119/860 |
| 6,604,490 B1 * | 8/2003 | Lee et al. | | 119/712 |
| 6,668,760 B2 * | 12/2003 | Groh et al. | | 119/718 |
| 7,377,234 B2 * | 5/2008 | Belcher | | 119/720 |
| 2002/0127946 A1 * | 9/2002 | Hornsby et al. | | 446/176 |

* cited by examiner

*Primary Examiner* — Rob Swiatek
*Assistant Examiner* — Justin Benedik
(74) *Attorney, Agent, or Firm* — Sheridan Ross P.C.

(57) ABSTRACT

A spray deterrent application type animal training apparatus and its control method is disclosed. The apparatus affixed to the collar of a dog provides a vibration stimulus, stimulus to olfactory sense and visual sense. The transparent spray deterrent reservoir case of the apparatus allows a trainer or an animal owner to simply identify level of spray substance. A light emitting diode (LED) is secured to the vicinity of a spraying nozzle of the spray unit and indicates a spray path by flashing a light on the spray path. Also, an animal is trained using stronger stimulus for a rapid learning at the beginning of training and is warned against an undesired behavior of an animal using light stimulus after being well trained.

11 Claims, 9 Drawing Sheets

ANIMAL TRAINING APPARATUS AND CONTROL METHOD THEREOF

BACKGROUND OF THE INVENTION

1. Field of the Invention

The present invention relates generally to an animal training apparatus and control method thereof, and more particularly to an animal training apparatus which applies spray deterrents to a dog, according to key selection of a remote transmitter, by a stimulus delivery mechanism provided in a receiver affixed to the collar of the animal.

2. Description of the Related Art

In order to correct an undesired behavior of an animal, especially a dog, it has been used an electrical animal training apparatus or a containment apparatus in general comprises a collar mounted radio receiver worn on the animal and a radio transmitter.

The radio transmitter transmits desired signals to the radio receiver which in turn applies an appropriate stimulus to the animal, such as a good tone/bad tone, electrical stimulation, vibration, citronella spray, etc.

In the case of a receiver which applies an electrical stimulation to an animal, the receiver unit typically includes a pair of electrode probes which are engaged with threaded terminal posts extending from the receiver unit and through the collar.

An electrical potential is applied between the electrode probes resulting in electrical current flowing through the skin of the animal. A strong electrical stimulation may hurt the skin of the animal or shock him mentally.

In order to avoid application of an electrical shock to a dog, as an example, there are known in U.S. Pat. No. 5,046,453 an animal training apparatus that releases cold fluid onto the skin of the animal and in U.S. Pat. No. 6,588,376 an appliance for dissuasion of a dog from barking by an irritant sprayed onto or into the vicinity of the dog's nose.

Also, U.S. Pat. No. 6,604,490 and U.S. Pat. No. 6,668,760 disclose an apparatus for controlling the barking of pet dogs by varying doses of the spray deterrent and period of spray time according to animal's response to previous deterrent attempts.

Further, U.S. Pat. No. 6,047,664 discloses an apparatus that includes a conventional visual indicator for providing a visual representation of the selected corrective stimulus intensity level and emits a corrective stimulus consisting of an electrical stimulus coupled with an audible warning sound. The visual indicator represents a selected stimulus intensity level to a trainer.

In the spray control bark collar disclosed in U.S. Pat. No. 6,604,490, the apparatus includes an indicator designed to give the animal trainer a warning when the deterrent reservoir is getting low before the reservoir becomes empty.

Obviously, if the reservoir is empty, then the spray control bark collar does not serve an effective deterrent. The method according to the prior art involves resetting a counter when the reservoir is filled. As the deterrent is applied, a counter is incremented to keep track of either the number of or the total time of the application. The counter is monitored and when a threshold value is reached, a low reservoir warning signal is produced.

The method measuring a low level of deterrent material by a counter has a problem in that it needs a complicated device for counting the number of application whenever the deterrent is applied.

SUMMARY OF THE INVENTION

Accordingly, the present invention has been made keeping in mind the above problems occurring in the prior art, and an object of the present invention is to provide a spray deterrent type animal training apparatus, which incorporates vibration stimulus method for controlling an animal in a more effective manner.

Another object of the present invention is to provide a spray deterrent type animal training apparatus, which allows a trainer to identify spray operation of the apparatus in a visual manner.

Another object of the present invention is to provide a spray deterrent type animal training apparatus, which allows a trainer to identify level of spray substance contained in a reservoir with the naked eye through the outer case of the apparatus.

Still another object of the present invention is to provide an animal training apparatus and control method thereof, which selectively applies a strong warning to the untrained animal at the beginning stage and a light warning to a considerably trained animal.

In order to accomplish the above object, an animal training apparatus according to the present invention provides a transmitter and a receiver, wherein: the transmitter includes a key input unit including a spray function selecting key, a vibration function selecting key, and a spray and vibration selecting key configured to allow a combination of spray and vibration and intensity levels of spray to be selected; a transmitter controlling unit for performing control so that a signal corresponding to a function selected and input by the key input unit is transmitted; and a radio transmitting unit for transmitting the radio signal corresponding to the selected function under the control of the transmitter controlling unit; and the receiver includes a radio receiving unit for receiving the radio signal from the transmitter; a spray unit for emitting spray substance in response to a spray operation command included in the signal received by the radio receiving unit; a vibration unit for generating vibrations in response to a vibration operation command in the signal received by the radio receiving unit; a light emitting unit including a light emitting diode installed near a spraying nozzle of the spray unit and configured to display a spray path by illuminating the path of a emitted spray substance; and a receiver controlling unit for controlling the above units.

Preferably, the spray substance reservoir included in the spray unit is made of transparent material so that the level of remaining spray substance can be checked from the outside.

Preferably, the upper case of the receiver is made of transparent material and the spray substance reservoir included in the spray unit is provided with a see-through window.

Preferably, the light emitting diode has directionality, and the light emitting diode is inclined to the central line of a spray nozzle at an angle of about 4° so that light meets the central line of the spray nozzle at the middle of the length of the spray path.

Preferably, the spray and vibration selecting key of the transmitter selects function for applying spray after vibration and first spraying time level, second spraying time level and third spraying time level for intensity of spray.

Preferably, if the spray function selecting key is pressed after a spray and vibration selecting key is switched to the first spraying time level, spray substance is sprayed for 70 millisecond, if it is pressed after being switched to the second spraying time level, the spray substance is sprayed for 210 millisecond, if it is pressed after being switched to the third spraying time level, a spraying operation continues for the period for which the spray function selecting key has been pressed.

Preferably, if the spray function selecting key is pressed after the spray and vibration selecting key is selected with a function for applying spray and vibration, the receiver generates vibration by operating the vibration unit, and then it sprays deterrent substance by operating the spray unit.

Preferably, if the spray function selecting key is pressed after the spray and vibration selecting key is switched to a function for applying spray and vibration, the receiver generates vibration corresponding to the first level by operating the vibration unit, and then it sprays spray substance by operating the spray unit and turns the light emitting diode on so as to illuminate a spray path, thereafter if the spray function selecting key is continuously pressed, it increasingly generates vibrations corresponding to the second level, the third level and the fourth level and it sprays spray substance by operating the spray unit.

In order to accomplish the above object, the present invention provides a method of controlling the receiver of the animal training apparatus, the method including receiving data from the transmitter; and determining whether any of a vibration mode, a spray mod and a mode spraying with vibration is selected; if the vibration mode is selected, generating vibration by operating the vibration unit; if the spraying and vibration mode is selected, spraying deterrent substance after generating vibration with first level; if the spray mode is selected, spraying deterrent substance by operating the spray unit for time varied according to a received level; if the spraying and vibration mode or the spray mode is selected, controlling the light emitting diode to radiate light and the light emitted from the light emitting diode illuminates the spray path; increasing a level of the vibration by one level and returning to the step of receiving data from the transmitter.

Preferably, the spray with vibration mode generates vibration for time corresponding to the selected mode from first level to forth level.

Preferably, the spray and vibration mode generates vibration and sprays spray substance simultaneously.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

The detailed construction, effects, characteristics and advantages of the present invention will be clearly described below in conjunction with the accompanying drawings and preferred embodiments.

Figure 1:
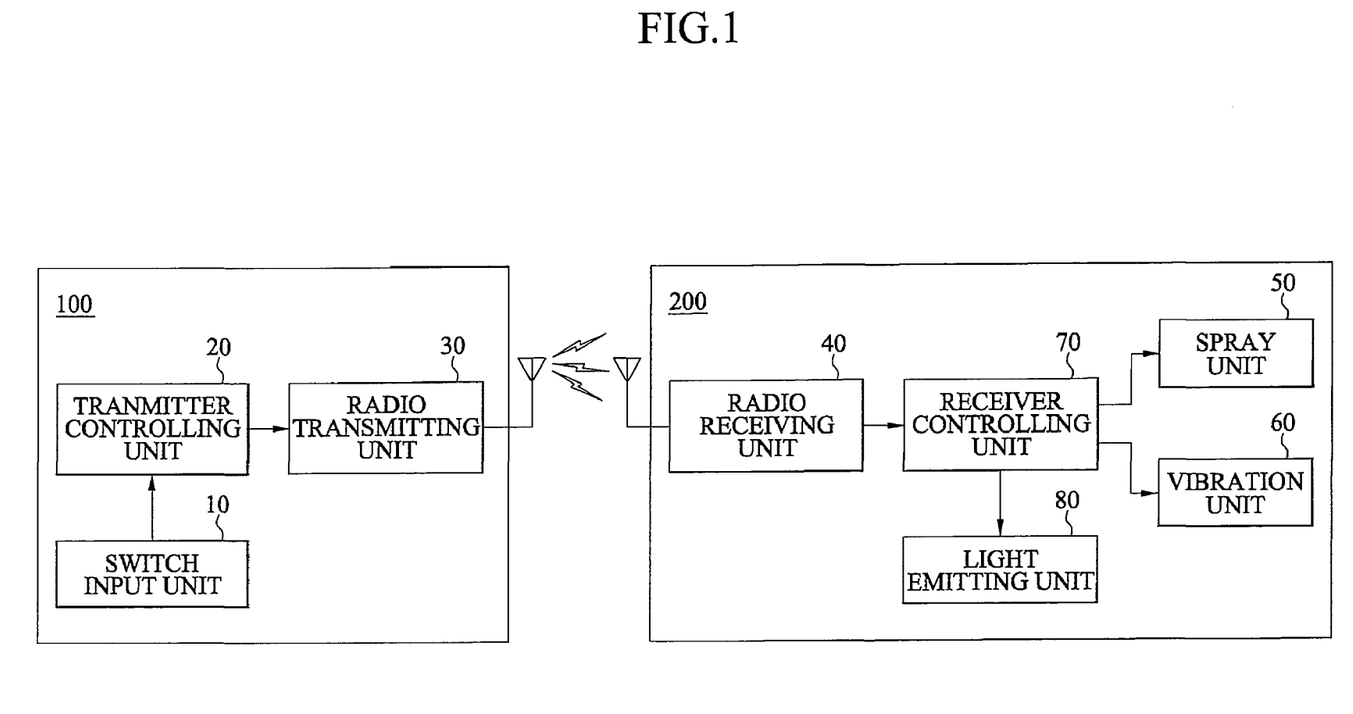
FIG. 1 is a block diagram showing system configuration of the animal training apparatus according to the present invention.

FIG. 1 is a block diagram showing the configuration of an animal training apparatus according to the present invention.

An animal training apparatus according to the present invention includes a transmitter 100 and a receiver 200. The receiver 100 is attached to a collar worn around the neck of an animal and the transmitter 200 is provided with key buttons which enable a trainer to select the functions of the receiver 100 when the receiver is far away from the trainer.

The transmitter 100 includes a key input unit 10 including a spray function selecting key 11, a vibration function selecting key 12, and a spray and vibration selecting key 13 configured to allow a combination of spray and vibration and spraying time levels indicating the intensities of spray to be selected; a transmitter controlling unit 20 for performing control so that a signal corresponding to a function selected and input by the key input unit 10 is transmitted; and a radio transmitting unit 30 for wirelessly transmitting the radio signal corresponding to the selected function under the control of the transmitter controlling unit 20.

The receiver 200 includes a radio receiving unit 40 for receiving the radio signal from the transmitter 100; a spray unit 50 for emitting spray substance in response to a spray operation command included in the signal received by the radio receiving unit 40; a vibration unit 60 for generating vibrations in response to a spray operation command in the signal received by the radio receiving unit 40; a light emitting unit 80 including a light emitting diode 93 installed near the spraying nozzle 92 of the spray unit 50 and configured to display a spray path by illuminating the path of the emitted spray substance; and a receiver controlling unit 70 for controlling the above units.

Figure 2:
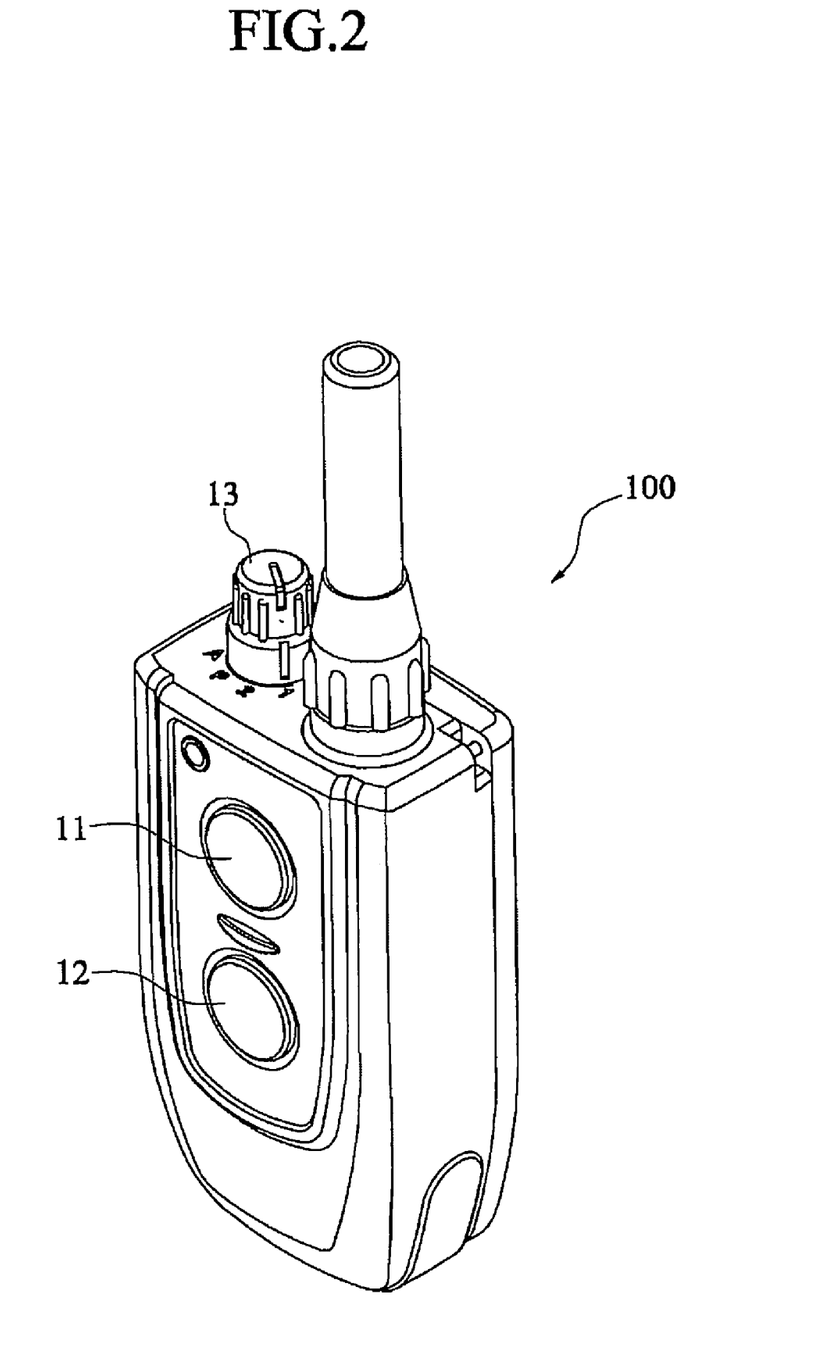
FIG. 2 is a perspective view showing a transmitter of the animal training apparatus according to the present invention.

The transmitter 100 of the animal training apparatus according to the present invention, as shown in FIG. 2, is designed in a portable size and weight for a trainer to carry along with it and manipulate it, and includes the spray function selecting key 11 and the vibration function selecting key 12 for responding to the corresponding commands so as to issue various commands or stimuli to an animal to be trained, and also the spray and vibration selecting key 13 for allowing a combination of spray and vibration and to select spraying time levels indicating the intensities of spray to be selected.

When the trainer presses the spray function selecting key 11 while holding the transmitter 100, a spray selection signal is input to the transmitter controlling unit 20, and the transmitter controlling unit 20 controls the radio transmitting unit 30, thereby transmitting a wireless signal, including a spray operation signal, to the receiver 200.

Figure 3:
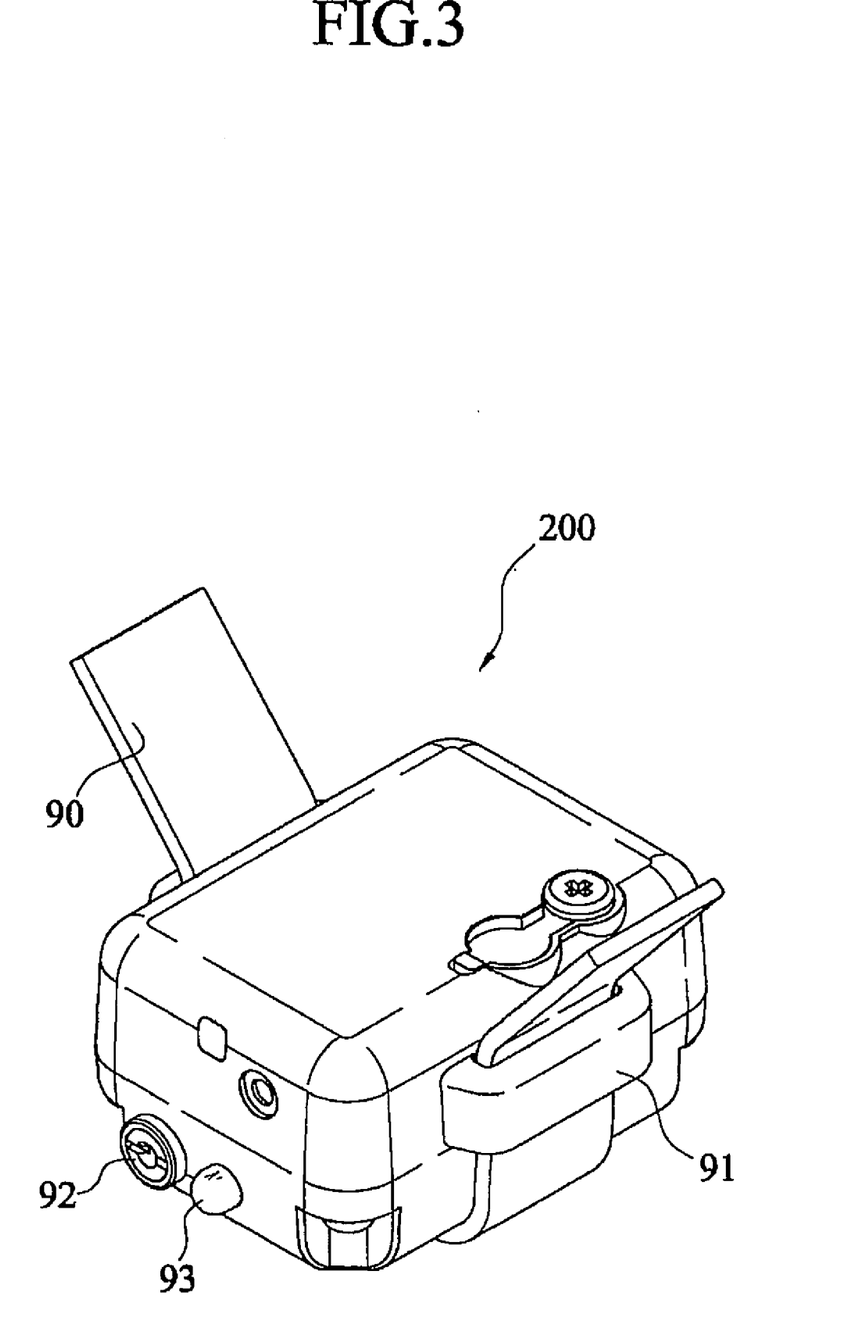
FIG. 3 is a perspective view showing a receiver of the animal training apparatus according to the present invention.
Figure 4A:
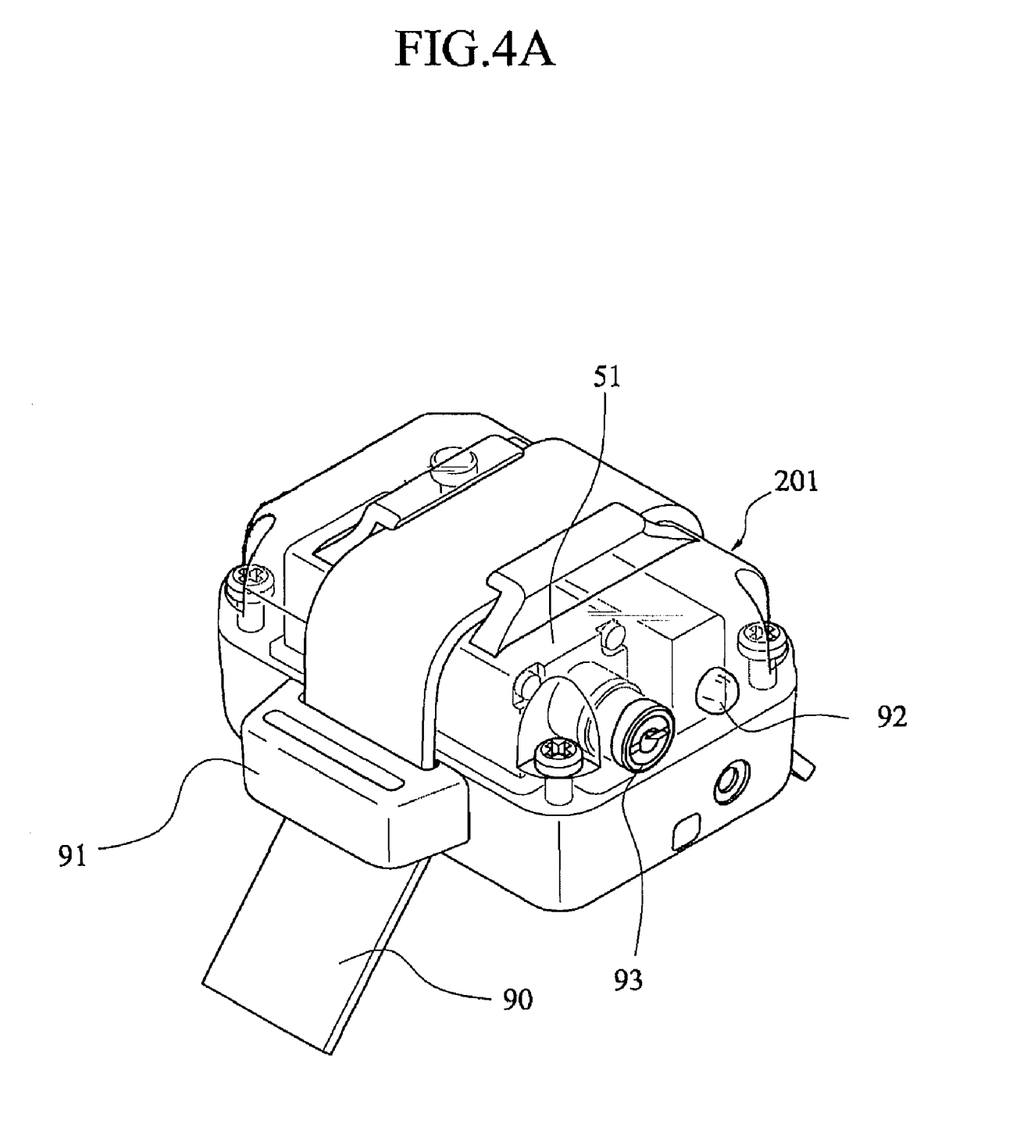
FIG. 4A is a perspective view showing the state in which the upper case of the receiver according to the present invention has been made of transparent material and the collar has been inserted thereto.
Figure 4B:
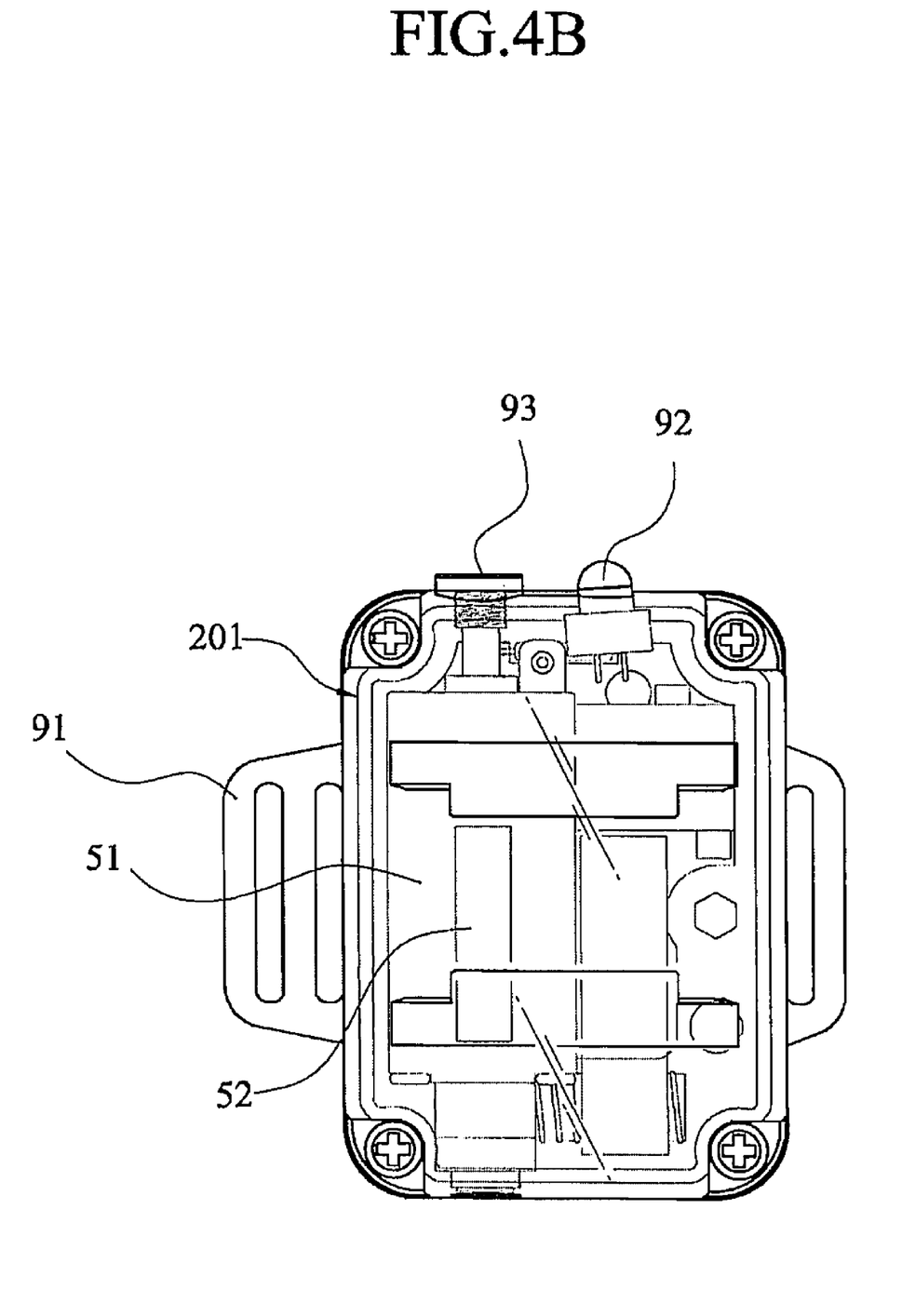
FIG. 4B is a plan view showing the state in which the collar has been removed from the receiver and the see-through window of an internal spray container can be seen according to the present invention.
Figure 5:
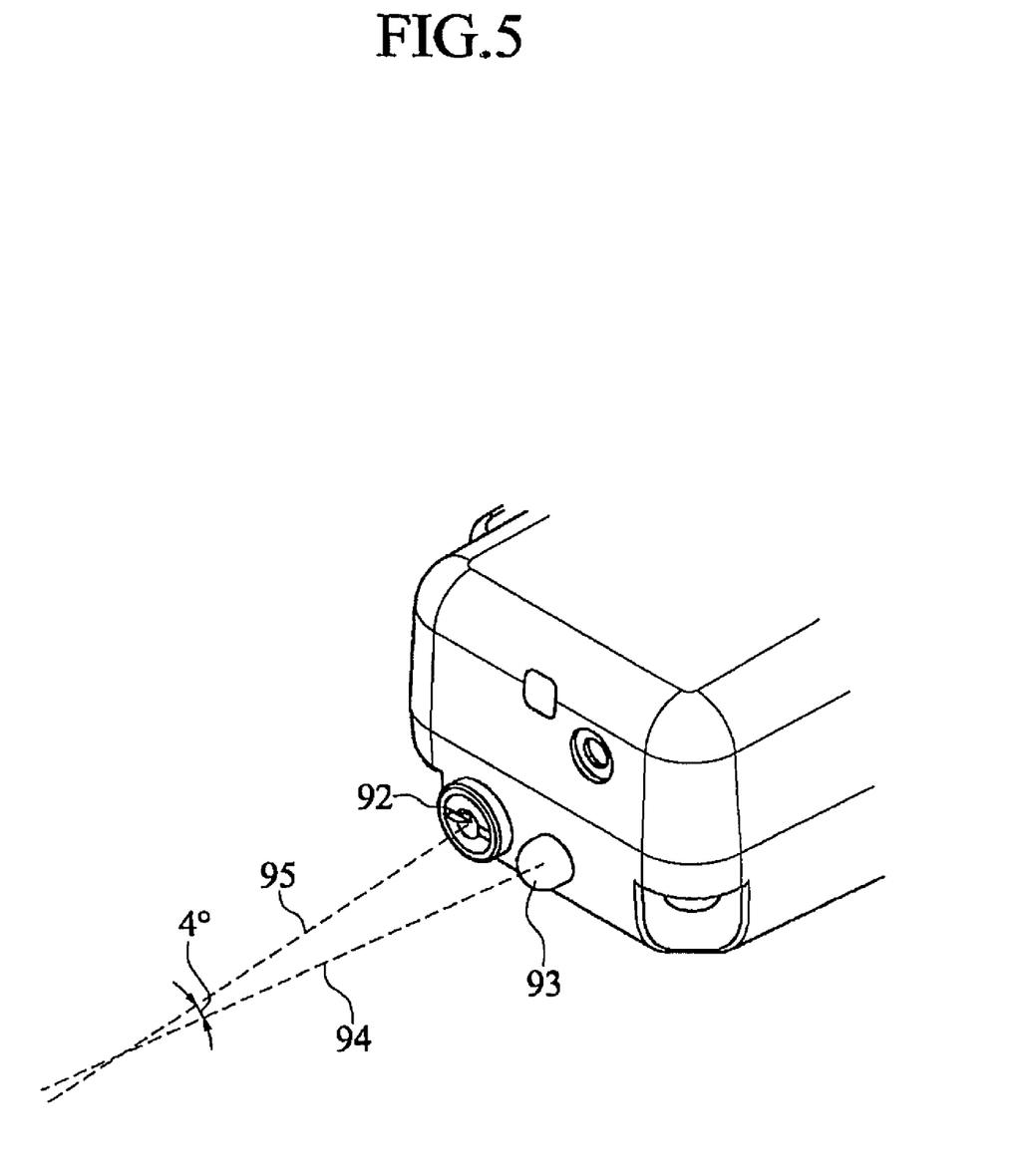
FIG. 5 is a partly perspective view showing an angle between the optical axis of the light emitting diode and spray path in the receiver of the animal training apparatus according to the present invention.

FIG. 3 is a perspective view showing the receiver of the animal training apparatus according to the present invention.

The receiver 200 according to the present invention includes a collar 90 worn on animal's neck and a supporting ring 91 configured to retain the receiving device 200 around animal's neck. Furthermore, the supporting ring 91 is configured such that the longitudinal central line of the supporting ring 91 is perpendicular to that of the collar 90 worn around animal's neck.

Figure 8:
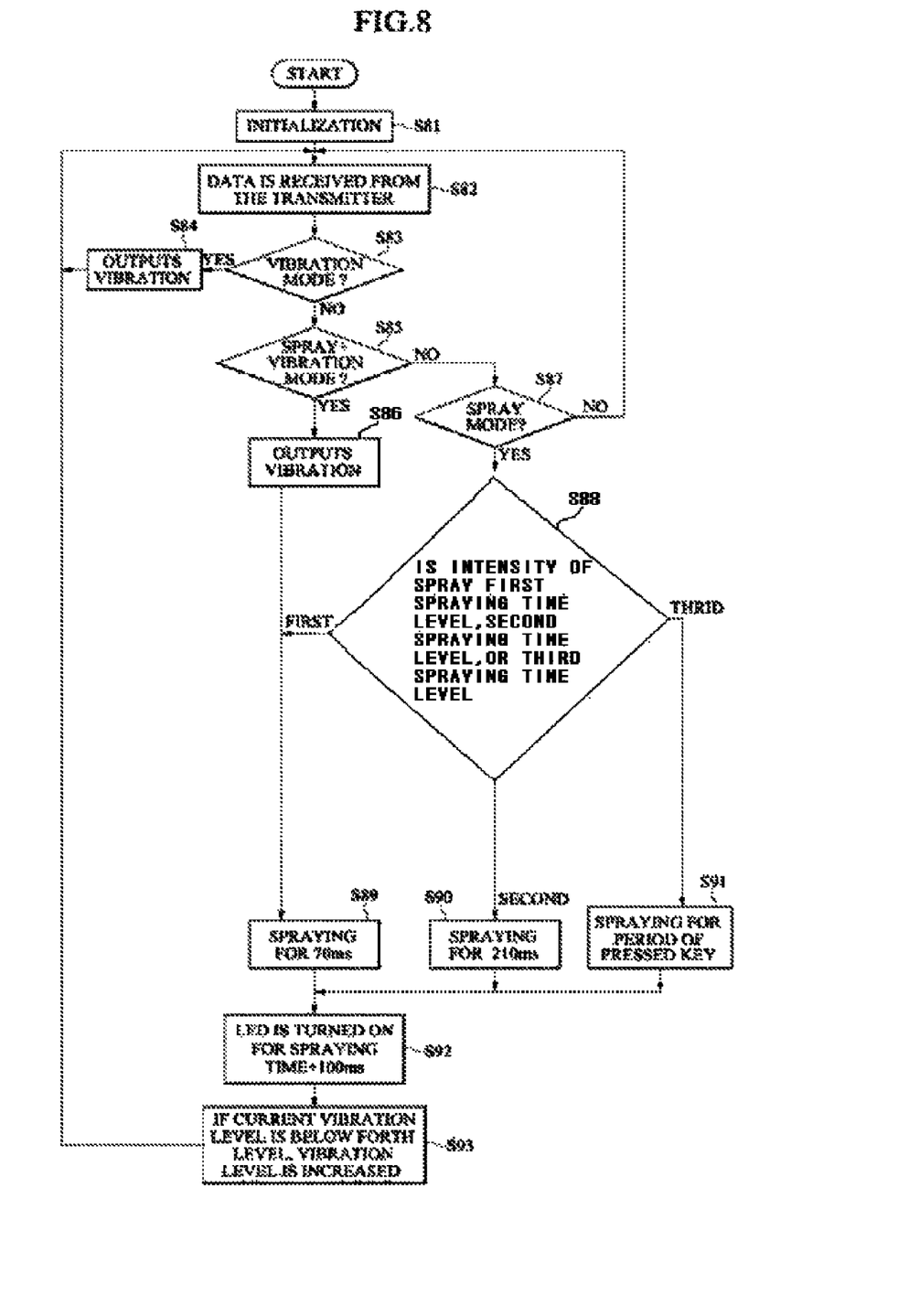
FIG. 8 is a flowchart showing a method for controlling the receiver of the animal training apparatus according to the present invention.

Accordingly, when the receiver 200 is worn around the neck of an animal, the spray direction of a spray nozzle 92 disposed on the top of the receiver 200 is directed toward the bottom of the animal's nose. Accordingly, when spray substance is emitted from the spray nozzle 92, the spray substance reaches the nose of the animal in length, so that an odor that is obnoxious to the animal stimulates the olfactory sense of the animal through the nose.

FIG. 4A is a perspective view showing the state in which the upper casing of the receiving device according to the present invention has been made of transparent material and the collar has been inserted thereto, and FIG. 4B is a plan view showing the state in which the collar has been removed and the see-through window of an internal spray container can be seen.

The receiver 200 according to the present invention is configured, as shown in FIG. 4A, such that the upper case 201 is made of transparent material, and the spray substance reservoir 51 included in the spray unit 50 is made of transparent material or a see-through window 52 is provided, so that the level of remaining spray substance can be checked from the outside.

Also, the spray substance reservoir 51 is made of transparent material or the see-through window 52 is provided as shown in FIG. 4B, so that the level of the spray substance contained in the reservoir 51 can be checked using the eyes.

In contrast to the case where consummation of the spray substance is determined by conducting counting whenever the spray substance is emitted, checking the level of the spray substance using the eyes is advantageous in that a complicated device such as a counter is not required, the cost of such a device can be eliminated, and the erroneous operation of such a device can be obviated.

A spray selection signal transmitted by the transmitter 100 is received by the receiver control unit 70 through a receiving antenna 41 and a radio receiving unit 40. The receiver control unit 70 operates the spray unit 50, thereby emitting the spray substance, which imparts an obnoxious odor or a chill sensation to the animal, toward the nose of the animal through the spray nozzle 92.

For example, the spray substance reservoir 51 provided in the receiver 200 according to the present invention is configured such that it is of the capacity of about 4.2 ml, the spray substance can be sprayed an average of 47 times in a single charging thereof, the spray substance is each time sprayed for a duration of 70 ms, and the spray substance is sprayed to a distance of 30 cm.

When the spray substance is sprayed, a light emitting diode 93 disposed near the spray nozzle 92 emits light, so that the particles of the spray substance reflects the light emitted from the light emitting diode 93, with the result that the trainer can view the path of the spray substance using the eyes.

The light emitting diode 93 has directionality, and the light emitted by the light emitting diode 93 is diffused to the outside of an optical axis 94 at an angle of about 4°. As shown in FIG. 5, the light emitting diode 93 is inclined to the central line 95 of the spray nozzle 92 at an angle of about 4° so that light meets the central line 95 of the spray nozzle 92 at the middle of the length of the spray path.

In other words, since the spray path is about 30 cm in length, the middle of the length of the spray path corresponds to a location about 15 cm away from the spray nozzle 92. Here, the central line 95 of the spray nozzle 92 is a line that passes through the center of the spray nozzle 92.

The light reflected from the fog of the emitted spray substance enables the trainer to view the emission of the spray substance when he or she is far from the animal or gives night training.

The receiver 200 according to the present invention is configured such that after the spray substance has been emitted, the light emitting diode 93 included in the light emitting unit 80 radiates light and, therefore, illuminates the spray path, so that the trainer can verify the emission of the spray substance, and so that a stimulus can be imparted to the animal because the animal can also see the light.

Furthermore, when the trainer presses the vibration function selecting key 12 of the transmitter 100, a vibration selection signal is transmitted to the receiving device 200. The receiving control unit 70 having received the vibration selection signal from the transmitter 100 operates the vibration generation unit 60, thereby imparting vibration to the skin of the animal.

When the trainer desires to apply a combination of vibration and spray to the animal, the trainer rotates the spray and vibration selecting key 13 to the position "P pager" and presses the spray function selecting key 11. As shown in FIG. 6(*a*), at a first vibration level, three pulses each having a duration of 200 ms corresponding to a duty ratio of 0.25 are output during each period of 800 ms, and then the spray substance is sprayed through the spray nozzle 92 for a duration of 70 ms after the time the three pulses have been output about 100 ms.

When the spray function selecting key 11 is pressed repeatedly after the spray and vibration selecting key 13 has been rotated to the position "P pager," second, third and fourth vibration levels are sequentially activated, so that three pulses each having a duration of 400 ms, 600 ms or 800 ms corresponding to duty ratios of 0.5, 0.75 or 1 are output at each level during each period of 800 ms, as shown in FIG. 6(*b*) to FIG. 6(*d*).

After three 400 ms, 600 ms or 800 ms pulses have been output at each level, the spray substance is sprayed by the spray nozzle 92 for a duration of about 70 ms, 100 ms after the three pulses have been emitted. In this case, immediately after the spray substance has been sprayed at each level, the light emitting diode 93 shows the spray path.

Furthermore, as shown in FIG. 7, vibration and spray may be applied at the same time. When the spray and vibration selecting key 13 is rotated to the position "P" and the spray function selecting key 11 is pressed, the spray substance is sprayed as shown in FIG. 7(*e*) at the same time that the first vibration level is activated as shown in FIG. 7(*a*). In the same manner, the spray substance can also be sprayed at the second, third or fourth level shown in FIG. 7(*b*) to FIG. 7(*d*).

By the switching between the four levels, an untrained animal is caused to rapidly accept training using a strong warning by applying a higher vibration level to the untrained animal, and a considerably trained animal is corrected for undesirable behavior using a light warning by applying a lower vibration level to the considerably trained animal.

In the same manner, when only the spray substance is applied to the animal, the spray and vibration selecting key 13 is configured to select the intensities of spraying using first and second levels, as shown in FIG. 2. Accordingly, an untrained animal is caused to rapidly accept training using a strong warning by applying a higher spraying level to the untrained animal, and a considerably trained animal is corrected for undesirable behavior using a light warning by applying a lower spraying level to the considerably trained animal.

FIG. 8 is a flowchart showing a method of controlling the receiver of the animal training apparatus according to the present invention.

At step S81, an initializing operation is performed. At step S82, data transmitted by the transmitter 100 is received through the receiving antenna 41 and the radio receiving unit 40. At step S83, whether the received data is vibration mode data is determined.

In the case that the received data is vibration mode data, vibration is output at step S84, and then the process proceeds to step S82. If the trainer has pressed the vibration function selecting key 12 when the vibration mode data is successively received from the transmitter 100, vibrations are applied to the animal for the period for which the trainer has pressed the vibration function selecting key 12.

Figure 6:
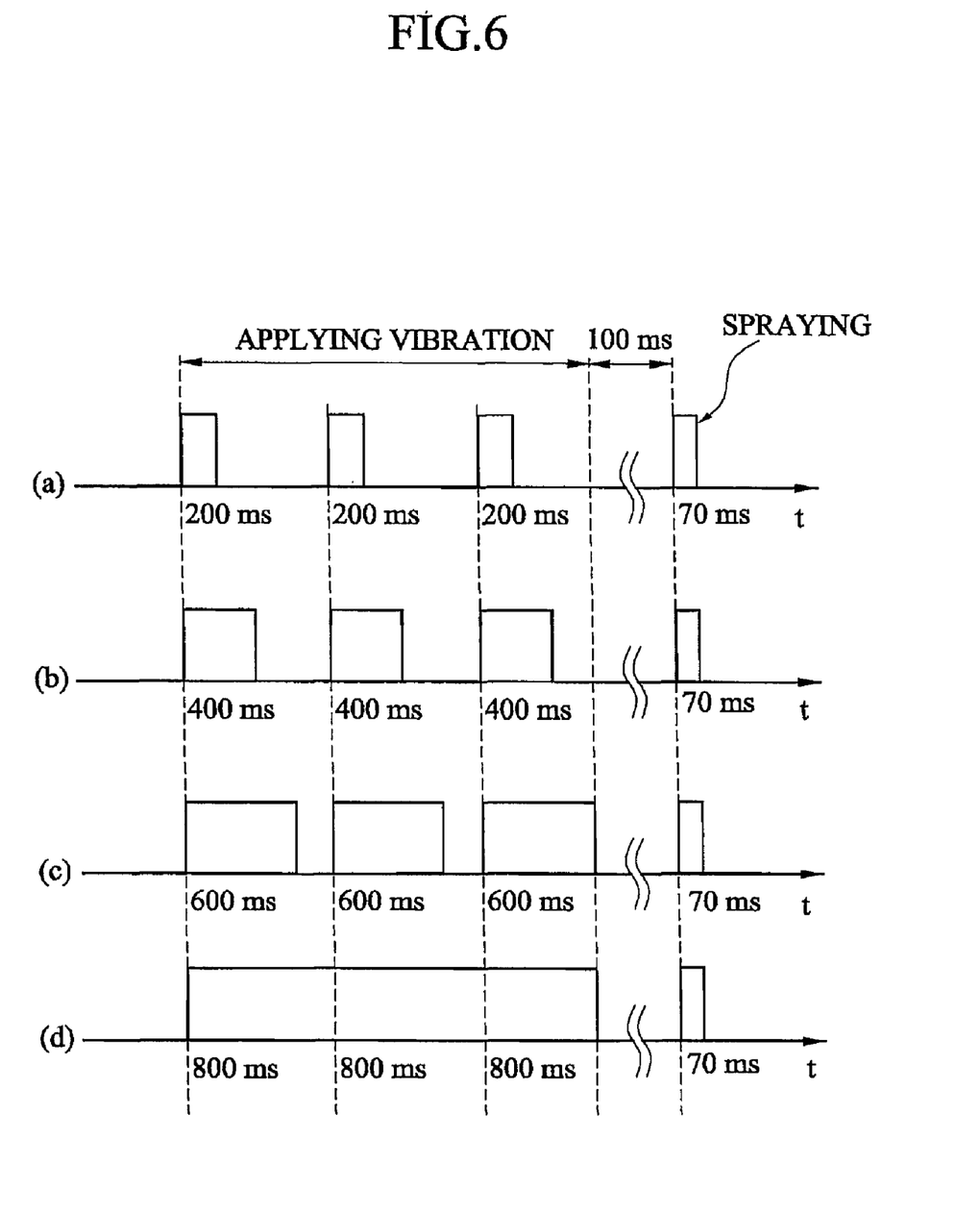
FIG. 6 is a timing diagram depicting various modes of sequential application of vibration and spraying according to the present invention.
Figure 7:
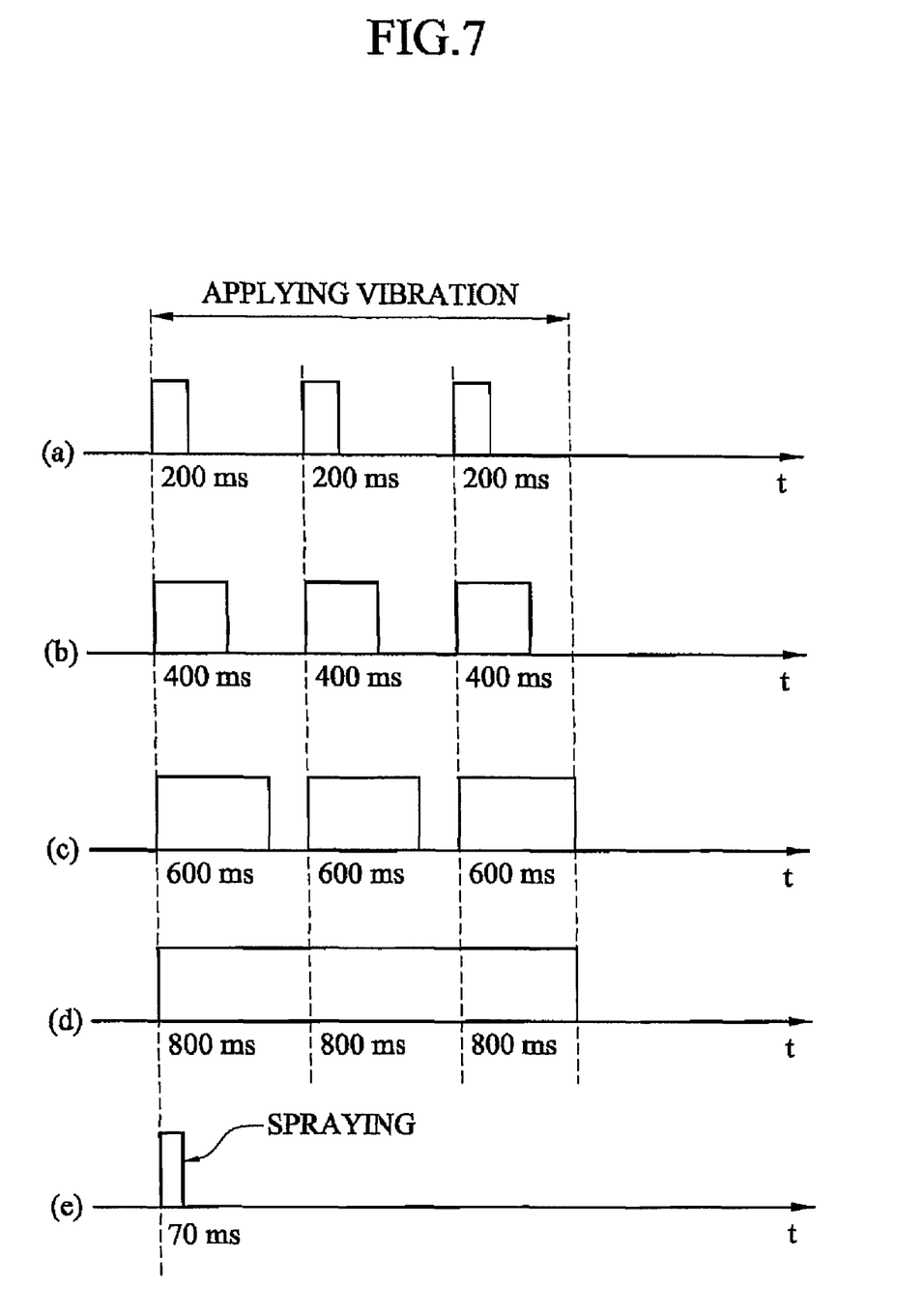
FIG. 7 is a timing diagram depicting various modes of simultaneous application of vibration and spraying in accordance with another embodiment of the present invention.

In the case that, as a result of the determination at step S83, the received data is not vibration mode data, the process proceeds to step S85 where whether the current mode is vibration+spray mode (a mode in which spray and vibration are applied together) is determined. If a spray+vibration mode signal has been received, three pulses each having a duration of 200 ms, corresponding to the first vibration level, are output, as shown in FIG. 6(a), and then applied to the animal.

Thereafter, the process proceeds to step S89 where the first spraying level is applied, that is, the spray substance is sprayed for a duration of 70 ms, and then to step S92 where the light emitting diode 93 is operated for a duration of the duration of spraying+100 ms=170 ms, thereby enabling the trainer to view the path of the spray substance using the eyes by causing the particles of the spray substance to reflect the light radiated by the light emitting diode 93.

At step S93, in the case that a current vibration level is lower than the fourth vibration level, the current vibration level is increased by one level. Thereafter, the process returns to step S82 where data is received from the transmitter 100, and step S82 and its following steps are repeated.

If during the repetition of step S82 and its following steps, the spray and vibration selecting key 13 has been selected as "P" and the trainer has continuously pressed the spray function selecting key 11, this is the case where vibration+spray mode continues, in which case the process proceeds from step S82 through step S83 and step S85 to step S86.

At step S86, the vibration level is increased to the second vibration level (at step S93 of a second process loop, the vibration level is increased) and then pulses each having a duration of 400 ms corresponding to a duty ratio of 0.5 are output during a period of 800 ms, as shown in FIG. 6(b), thereby imparting strong stimuli to an animal during training.

In the same manner, if in the state where the vibration level has been increased to the second vibration level, the spray and vibration selecting key 13 has been selected as "P" and the trainer has continuously pressed the spray function selecting key 11, the vibration level is increased to the third vibration level at step S93 of a third process loop, and then pulses each having a duration of 600 ms corresponding to a duty ratio of 0.75, which corresponds to the third vibration level, are output during a period of 800 ms, as shown in FIG. 6(c), at step S86.

If in the state where the vibration level has been increased to the third vibration level, the spray and vibration selecting key 13 has been selected as "P" and the trainer has continuously pressed the spray function selecting key 11, the vibration level is increased to the fourth vibration level at step S93 of a fourth process loop and then pulses each having a duration of 800 ms corresponding to a duty ratio of 1 are output during a period of 800 ms, as shown in FIG. 6(d).

The reason why training is performed by switching between the four vibration levels is to cause an untrained animal to rapidly accept training using a strong warning by applying a higher spraying level to the untrained animal, and to correct a considerably trained animal for undesirable behavior using a lighter warning by applying a lower spraying level to the considerably trained animal.

Meanwhile, if, as a result of the determination at step S85, the current mode is determined not to be spray+vibration mode, the process proceeds to step S87 where whether the current mode is spray mode is determined. In the case that the current mode is not spray mode, the process proceeds to step S82 wherein data is received from the transmitting device. If the current mode is spray mode, the process proceeds to step S88 where which of the first, second and third spraying levels has been selected is determined.

In the case that the trainer has switched the spray and vibration selecting key 13 of the transmitter 100 to the first level, the spray substance is sprayed for a duration of 70 ms at step S89.

If the trainer has switched the spray and vibration selecting key 13 to the second level, the spray substance is sprayed for a duration of 210 ms at step S90. If the trainer has switched the spray and vibration selecting key 13 to the third level (designated as in FIG. 2), a spraying operation continues for the period for which the spray function selecting key 11 has been pressed, thereby completely discharging all the spray substance from the reservoir 51 included in the receiver 200.

Meanwhile, after the spray substance has been sprayed at each level, the process proceeds to step S92 where the light emitting diode 93 is operated for a duration of the duration of spraying+100 ms, thereby enabling the trainer to view the emission of the spray substance using the eyes by causing the particles of the spray substance to reflect the light.

At step S93, in the case that the current vibration level is lower than the fourth vibration level, the current vibration level is increased by one level. Thereafter, the process is returned to step S82 where data is received from the transmitter 100, and step S82 and its following steps are repeated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An animal training apparatus including a transmitter and a receiver, wherein:
    the transmitter includes:
        a key input unit including a spray function selecting key, a vibration function selecting key, and a spray and vibration selecting key configured to allow a combination of spray and vibration and intensity levels of spray to be selected;
        a transmitter controlling unit for performing control so that a signal corresponding to a function selected and input by the key input unit is transmitted; and
        a radio transmitting unit for transmitting the radio signal corresponding to the selected function under the control of the transmitter controlling unit;
    the receiver includes:
    a radio receiving unit for receiving the radio signal from the transmitter;
        a spray unit for emitting spray substance in response to a spray operation command included in the signal received by the radio receiving unit;

a vibration unit for generating vibrations in response to a vibration operation command in the signal received by the radio receiving unit;

a light emitting unit including a light emitting diode installed near a spraying nozzle of the spray unit and configured to display a spray path by illuminating the path of a emitted spray material; and a receiver controlling unit for controlling the above units.

2. The animal training apparatus as set forth in claim 1, wherein a spray substance reservoir included in the spray unit is made of transparent material so that the level of remaining spray substance can be checked from the outside.

3. The animal training apparatus as set forth in claim 1, wherein an upper case of the receiver is made of transparent material and a spray substance reservoir included in the spray unit is provided with a see-through window.

4. The animal training apparatus as set forth in claim 1, wherein the light emitting diode has directionality, and the light emitting diode is inclined to a central line of a spray nozzle at an angle of about 4° so that light meets the central line of the spray nozzle at the middle of the length of the spray path.

5. The animal training apparatus as set forth in claim 1, wherein the spray and vibration selecting key of the transmitter selects function for applying spray after vibration and first spraying time level, second spraying time level and third spraying time level for intensity levels of spray.

6. The animal training apparatus as set forth in claim 1, wherein if the spray function selecting key is pressed after a spray and vibration selecting key is switched to the first level, spray substance is sprayed for 70 millisecond, if it is pressed after being switched to the second level, the spray substance is sprayed for 210 millisecond, if it is pressed after being switched to the third level, a spraying operation continues for the period for which the spray function selecting key has been pressed.

7. The animal training apparatus as set forth in claim 1, wherein if the spray function selecting key is depressed after the spray and vibration selecting key is selected with a function for applying spray and vibration, the receiver generates vibration by operating the vibration unit, and then it sprays spray substance by operating the spray unit.

8. The animal training apparatus as set forth in claim 7, wherein if the spray function selecting key is pressed after the spray and vibration selecting key is switched to a function for applying spray and vibration, the receiver generates vibration corresponding to the first level by operating the vibration unit, and then it sprays spray substance by operating the spray unit and turns the light emitting diode on so as to illuminate a spray path, thereafter if the spray function selecting key is continuously pressed, it increasingly generates vibrations with second level, third level and fourth level and it sprays spray substance by driving the spray unit.

9. A method for controlling an animal training apparatus comprising:

receiving a selected function data from a transmitter, the selected function data comprising a vibration mode, a spray mode, and mode spraying with vibration function;

determining whether any of a vibration mode, a spray mode, and mode spraying with vibration function is selected;

if the vibration mode is selected, generating vibration by activating a vibration unit of the receiver;

if the spray mode is selected, activating the spray unit of the receiver for spraying the spray substance by operating the spray unit for a time interval varied according to a received level signal;

if the mode spraying with vibration function is selected, activating a spray unit of the receiver for spraying a spray substance after generating vibration at a first intensity level;

if the mode spraying with vibration function or the spray mode is selected, activating a light emitting diode to radiate light such that the light emitted from the light emitting diode illuminates the spray path;

increasing the intensity level of the vibration by one level and returning to the step of receiving data from the transmitter.

10. A method for controlling the animal training apparatus of claim 9, wherein if the mode spraying with vibration function is selected, the receiver in the mode spraying with vibration function generates vibration for a time interval varied corresponding to the selected mode.

11. A method for controlling the animal training apparatus of claim 9, wherein if the mode spraying with vibration function is selected, the receiver in the mode spraying with vibration function generates vibration and sprays the spray substance simultaneously.

\* \* \* \* \*